иis

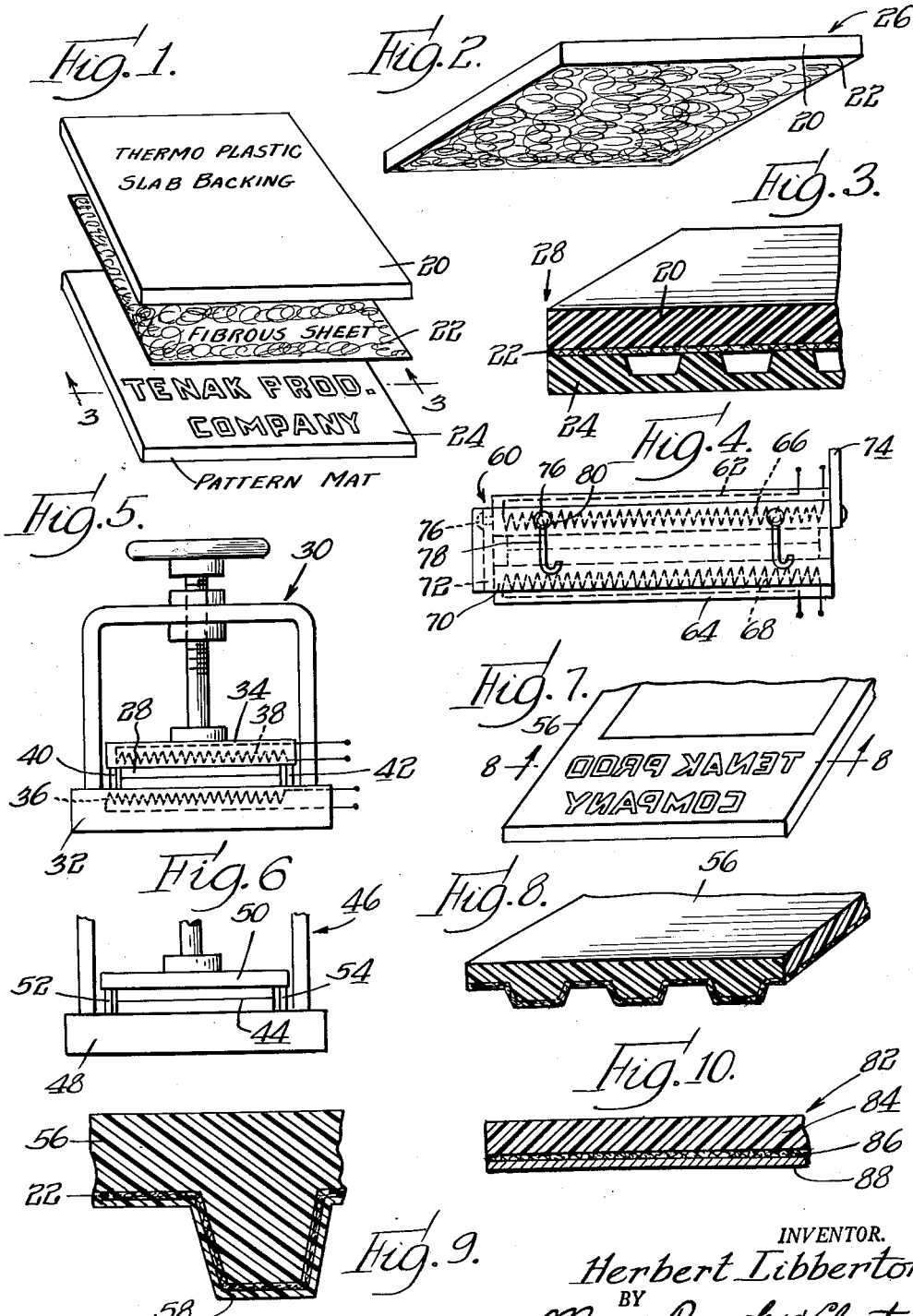

United States Patent Office 3,031,959
Patented May 1, 1962

3,031,959
PRINTING PLATE WITH PAPER LAYER
Herbert Libberton, Chicago, Ill., assignor to Tenak Products Company, Chicago, Ill., a corporation of Illinois
Filed Dec. 14, 1953, Ser. No. 398,123
5 Claims. (Cl. 101—395)

This invention relates to the manufacture of articles having shaped or molded surfaces, to the articles produced thereby, and to blanks or compositions produced at various stages of the procedure. More particularly, it relates to a method of making plastic printing plates, compositions usable in the manufacture of such plates, and to plates produced therefrom. The present case is a continuation-in-part of my co-pending application, Serial No. 160,280, filed May 5, 1950 and now abandoned.

In accordance with the method of making plastic printing plates now in general use, such plates are produced from plastic vinyl resins in granulated form by spreading the granules over a female matrix of the thermosetting type in sufficient quantity to provide eventually a solid plate of the desired final thickness. Obviously, it is necessary for the granules to be spread on the matrix to a thickness considerably greater than that of the plate to be manufactured.

When the granules have been arranged on the matrix as described, a metal plate is placed over the body of granules, and the entire assembly is placed in a hydraulic press between platens which are usually maintained at a temperature of around 275 degrees F. Light pressure is then applied to the assembly for a period of several minutes, after which higher pressures are gradually applied until a pressure of approximately 1700 pounds per square inch is reached. Steel bearers or stops are used to prevent the press from closing further after the platens have reached a predetermined distance apart, and the foregoing pressure is sufficient to cause the granules to coalesce into a solid plate and close the press sufficiently to engage the stops or bearers.

Thereafter the above described hot press is opened and the assembly is moved to a press with cold platens, where it is maintained under light pressure until the assembly has cooled to room temperature. The plate is then separated from the mold and trimmed. If all the requirements for producing a perfect plate have been fulfilled, the result will be a duplicate in reverse of the female mold.

However, the granules are messy to use. They have a tendency to stick to the hot platens and because they do not coalesce properly at the edges large amounts fall off the edges of the matrix onto the floor. Relatively large mats are required for use with granules because granules do not develop much back pressure and thus tend to spread. Another difficulty connected with the use of granules is that pin holes often occur in the surface of the plate, making it necessary for the plate to be discarded. In addition, bubbles which may not be apparent upon visual inspection of the plate are likely to develop where the granules have not properly knit or coalesced. Even though the bubbles are not apparent on visual inspection, the surface of the plate beneath which these bubbles are located is likely to collapse in use. In an effort to detect the presence of such sub-surface defects in time so that a plate containing them may be discarded and a new plate, free of defects made, plates manufactured as described above prior to releasing them for use in printing or in the manufacture of stereotype mats are "bumped," i.e., they are subjected to a heavy pressure approximating that employed in printing and in the manufacture of stereotypes, and then carefully inspected for any breakdown in the plate surface caused by the collapsing of the surface into a sub-surface bubble. Even plates which pass this test satisfactorily, however, may fail in use because when the plates are sent out for stereotyping, a much worse test occurs. In the making of stereotype mats from these plates the tonnage is not only tremendous, but it is most generally applied with a rolling motion, and sub-surface defects not previously located will often appear under this severe treatment. In such cases the resulting stereotype is faulty, and usually there is no time to call for a new plate.

It is evident that many of the above described defects, characteristics of the formation of printing plates from plastics in the form of granules, could be avoided by forming the plates from plastics in the form of slabs or sheets. Attempts to form the plates from slabs or sheets disclose other difficulties characteristic of that method. It is not possible simply by substituting a slab or sheet for the granules to mold satisfactory plates. The material in such a slab or sheet cannot be forced down into the smaller depressions in the matrix by the application of heat and pressure. Attempts to make plates from slabs or sheets of plastics of widely varying physical characteristics lead to the same result, that accurate molding is not possible.

It is an object of this invention to provide an improvement in the process of making plastic printing plates by molding plastic material against a pattern by means of which it is possible to produce plastic printing plates having accurate printing surfaces, registering accurately with the pattern and with other like plates and patently free of sub-surface defects, and to provide improved printing plates having some or all of these characteristics, and improved plastic materials for making such plates.

A further object is to provide an improvement in the process of making plastic printing plates by molding plastic material against a pattern by means of which it is possible with a minimum waste of material to produce plastic printing plates as described in the preceding paragraph, which may be used in direct relief printing or as an ad plate for the production of stereotype mats, and to provide such improved plates.

A still further object is to provide a blank adapted to be molded readily into a printing plate having an accurate surface, and patently free of sub-surface defects.

Other objects will appear hereinafter.

It has now been found that the foregoing objects are accomplished by forming plastic printing plates from a combination comprising a thermoplastic slab backing and a thin sheet of paper through which the thermoplastic material of the slab backing penetrates during the operation of forming the printing plate. In the operation of molding or forming the printing plate the sheet of fibrous material is sandwiched between the slab and the female matrix or mat of the thermosetting type into which the printing plate is to be molded. Molding of this assembly with the aid of heat and pressure contours the paper as well as the slab and results in the formation of a plastic printing plate which is not only free of surface or sub-surface defects but which is also accurately molded due to the presence of the paper sheet.

The thermoplastic slab backing may be formed from any desired thermoplastic resinous materials which are non-resilient and tough but flowable at elevated temperature and do not form gas at proper molding temperatures, but preferably is composed of resins of the vinyl and/or vinylidene group. It may include various preservative materials, such as antioxidants, as well as other compounding ingredients, such as plasticizers and mold release agents or lubricants. However, it is frequently necessary or desirable to machine the finished plate to accurate thickness, and in such cases it is preferable to avoid the use of fillers in the slab backing, or to use a minimum amount of filler, since fillers have a tendency to dull the tools used in the machining of the sheet.

It is important that the material of which the thermoplastic slab backing is formed be both tough and flowable at elevated temperature so that during molding it may be forced down into the recesses in the mat or pattern. It should be non-resilient, that is, not too rubbery, so that when it is molded it will hold the shape to which it is molded and not tend to regain its former configuration. The objection to gas forming resinous materials, of course, is that the gas formed produces bubbles in the body of plastic which are surface or sub-surface defects in the finished plate. Toughness is important, because in practice the slab material is ordinarily trimmed or cut to desired size with a knife or guillotine and must therefore be tough enough so that it will not shatter when it is so cut. Also, a finished printing plate which tends to shatter is undesirable, since these plates frequently receive rather rough handling and ability to receive nails without splitting is another desirable and useful characteristic. Still another desirable characteristic of thermoplastic materials to be used in forming printing plates is that they should be resistant to the solvents usually employed in the printing industry.

The composition of the thermoplastic slab backing is particularly important because the material of the thermoplastic slab backing during the molding operation, in addition to impregnating the paper layer, exudes through this layer to form a continuous plastic face on the exposed side of the paper layer and provide the printing surface of the ultimate plate. It is particularly important to avoid excessive softness in the thermoplastic material which causes an undesirable amount of cold flow, and to this end it is generally desirable to avoid the use of plasticizers in the compound, or to use such plasticizers in an amount not sufficient to produce excessive softness or cold flow.

Of course the most important element in the compounding of the slab backing is the thermoplastic resinous material or materials. The preferred combination of toughness and flowing characteristics or moldability is found in a variety of different combinations of thermoplastic resinous materials and compounding ingredients. A particularly preferred composition, however, is provided by a combination of two thermoplastic resinous materials, one of which contributes desirable flow characteristics, and the other toughness. One such combination consists of two resinous materials both of which are copolymers of polyvinyl chloride and polyvinyl acetate. The one, contributing flow properties, contains approximately 87% polyvinyl chloride and 13% polyvinyl acetate, and is sold commercially under the trade name Vinylite VYHH, and the other, contributing toughness, contains approximately 94% polyvinyl chloride and 6% polyvinyl acetate, and is sold commercially under the trade name Vinylite VYNW. The preferred composition hereinafter set forth, in addition to these two resinous materials, contains only two antioxidants, the second of which, calcium stearate, also serves as a mold release agent, and includes the two resinous materials in the proportion of sixty parts by weight of the VYHH resin and forty party by weight of the VYNW resin.

It is an important feature of the invention that the backing is preformed as a slab prior to the molding operations. This slab is formed by compounding the various materials of which it is composed on a rubber mill or other equivalent mixing equipment, and then after the various ingredients are well mixed together, the composition is sheeted out to proper thickness.

The thin paper sheet used in combination with the thermoplastic backing slab is thought to serve to oppose lateral flow of the plastic material during molding, whereby the molding pressure becomes more effective to force the material being molded down into the female matrix. For this reason it is desirable that the paper sheet be composed of relatively long fibres which extend in various directions. It is also important that the paper be one which retains its strength at the molding temperature of the backing slab with which it is used. Particularly preferred materials are tissue type papers or long fibre papers, such as Japanese or manila fibre paper, or banana fibre paper in which the fibres are crisscrossed and interlaced and extend in all directions.

The invention is not limited to any particular thickness of the paper or tissue sheet, since the thickness of the sheet to give satisfactory results will vary depending upon its density. As noted above, the sheet should have such thickness and density as to perform its function of minimizing lateral flow, but should not be so thick and dense that the plastic material of the slab backing is unable to penetrate the paper sheet and impregnate the fibres and exude through to the opposite face during the molding operation and the paper should also be of a type which will contour during molding to conform to the configuration molded into and upon the face of the slab.

It has been found to be preferable to calender or otherwise secure the paper sheet to the thermoplastic backing slab prior to the molding operation. This simplifies the operation of preparing the assembly for the molding step. For example, the molder has only one sheet of material to cut to the desired size of the printing plate to be formed. It is within the scope of the invention, however, to employ a paper sheet which is separate from the slab backing and is arranged in proper relation thereto in preparing the assembly for molding. The paper layer employed in a single printing plate, moreover, need not be an integral sheet but may be made up of a number of pieces assembled in contact with the surface of the slab backing and likewise the slab backing for a single printing plate may be either a single piece or a plurality of pieces laid edge to edge or one over the other.

It has been found to be desirable in certain instances to apply a thin coat of a varnish to the paper face of the assembled backing slab and fibrous sheet. The varnish preferably comprises a thermoplastic resin, such as a vinyl resin, having characteristics similar to the material of the backing slab and compatible therewith, and preferably also includes a mold release agent. It has been found that in many instances, the application of such a varnish to the paper sheet surface greatly improves the quality of the molded surface of the printing plate and reduces the possibility of damage to the printing surface during removal of the printing plate from the mold. While many resins may be used in the varnish, a preferred resin is a copolymer of vinyl chloride and vinyl acetate containing about 88.5% to 90.5% vinyl chloride and commercially sold as Vinylite VYNS. The varnish preferably comprises a 7% solution of the Vinylite VYNS in ethylene dichloride. This solution may also include a mold release agent such as, for example, stearic acid or one of the organo-silicon polymers, known as silicones. A preferred silicone is the product known as "No. 7 Silicone Grease." Where a mold release agent such as stearic acid is employed it has been found that very good results are obtained when the varnish contains about 5% by weight of the stearic acid. When a silicone, such as the "No. 7 Silicone Grease" is used it has been found that only a trace of the silicone in the varnish is sufficient to give the desired mold release characteristics.

While various solvents may be used, it is preferable to use a solvent such as ethylene dichloride, which will evaporate quickly and which will not attack the surface of the slabs on which the paper sheet is carried. Solvents which attack the surface of the slab tend to evaporate very slowly and result in a soft surface on the slab which is undesirable. If desired, a coloring ingredient may be added to the varnish, for example, so as to give it the same color as that of the slab to which it is applied.

The varnish may be applied in any suitable manner, such as by brushing, spraying, or flowing it over the paper sheet surface. This latter method is particularly effective in a process in which the paper sheet in the form of a continuous sheet is applied in a continuous operation to the slab as it issues from calender rolls in a continuous strip. The resulting assembly still in continuous form may, for example, be passed under a source of the varnish from which the latter is allowed to drip onto the paper sheet surface in sufficient quantity to maintain a body of the varnish flowing over the full width of the assembly. Varnish running off the edge of the assembly may be recovered and reused.

Although particular proportions of resin and mold release agent are set forth above it should be understood that these are merely illustrations of preferred proportions. Varnishes containing percentages of the above named or other resins which are either greater or less than 7% may be used as desired and in like manner the percentage of mold release agent may be varied both above and below the preferred proportions set forth above. It is also within the scope of the invention to include other ingredients in the varnish as desired, such as coloring matter, for example, and to include in the varnish two or more resins and/or mold release agents instead of only one of each.

After the varnish is applied to the assembly it is preferable to permit or cause the solvent in the varnish to evaporate before the paper sheet surface is covered, as for example, in packaging, in any way which will delay completion of the evaporation of the solvent. The evaporation may be merely permitted to occur under room conditions or may be accelerated by any suitable means, such as application of heat, moving air and the like or a combination of such means.

Any desired technique for applying the necessary heat and pressure may be employed in the molding of printing plates in accordance with the present invention. The assembly for molding, as described above, will include a female matrix or pattern mat, a piece of thermoplastic slab backing as described herein and a paper sheet layer arranged with the paper sheet in contact with the formed face of the mat and sandwiched between it and the slab backing, it being understood that the paper sheet and slab may have been secured together previously, if desired, as described above. In accordance with the preferred molding technique, such an assembly is first placed in a press with platens heated to molding temperature. Preferably, the assembly is allowed to heat to molding temperature in this press under a moderate pressure sufficient to maintain good contact but not sufficient to cause any appreciable hot molding action. For the preferred slab composition described above, the temperature of the platens of the press may be, for example, about 300 degrees F. Under these conditions about two to four minutes of preheating has been found to be satisfactory. After the slab has been heated to molding temperature in the hot press, preferably with no delay in the actual transfer, the molded assembly is removed to a press with cold platens, in which it is subjected to high pressure, while still at elevated temperature, to produce the full depth of penetration desired in the finished plate. This pressure, in the case of the composition described above, including Vinylite VYHH and Vinylite VYNW, is preferably in the amount of about 1750–2000 pounds per square inch. The assembly is preferably maintained under the high pressure in this press until it has cooled. If the transfer from the hot press to the cold press and the application of the pressure therein are made quickly there is not sufficient time for the material to cool below molding temperature before the molding is completed in the cold press.

In order that the invention may be better understood, reference is made to the accompanying drawings which form a part of this specification, and in which:

FIG. 1 is an exploded view in perspective showing the assembly employed to form a printing plate in accordance with one embodiment of the present invention;

FIG. 2 is a view in perspective showing a slab backing with a paper sheet secured thereon;

FIG. 3 is an enlarged fragmentary perspective view in cross-section on the line 3—3 in FIG. 1, illustrating the assembly shown in FIG. 1 after the elements thereof have been brought together preparatory to molding the printing plate;

FIG. 4 is an elevational view of a preheater showing an assembly in place being preheated;

FIG. 5 is an elevational view of a hot press showing an assembly undergoing a hot pressing step;

FIG. 6 is an elevational view of a cold press, showing an assembly cooling under high pressure;

FIG. 7 is a fragmentary view in perspective, illustrating a finished printing plate;

FIG. 8 is an enlarged fragmentary perspective view in cross-section, taken along the line 8—8 in FIG. 7, showing a finished printing plate made in accordance with one embodiment of the invention;

FIG. 9 is a still further enlarged view in cross-section taken on the same line as FIG. 8; and FIG. 10 is an enlarged detailed view in cross-section taken on a line equivalent to the line 10—10 in FIGURE 2 but showing a modified form of the invention.

The essentials of the assembly used to form printing plates in accordance with this invention are illustrated in FIG. 1. These include a thermoplastic slab backing 20, a thin paper or more specifically tissue sheet 22, and a pattern or pattern mat 24 carrying a positive impression of matter to be printed. FIG. 2 illustrates a preferred preformed unit 26 for use in the practice of the invention which consists of thermoplastic slab backing 20 having the paper sheet 22 calendered on or otherwise secured to one face thereof.

The assembly 28 illustrated in FIG. 3 is the same, however, in either case, that is, the slab 20, sheet 22 and pattern mat 24 are arranged in the order shown, with the paper sheet 22 sandwiched between the slab 20 and the pattern 24. To form a printing plate, the assembly 28 is preferably preheated first to molding temperature, for example, in a press 30 as illustrated in FIG. 5. In this press 30 both the stationary platen 32 and the movable platen 34 are provided with heating means such as the electrical heating elements 36 and 38, which are indicated. During the heating of the assembly 28 in the press 30, the press is closed sufficiently to maintain good contact between the parts of the assembly 28 and the platens 32 and 34 and assure rapid uniform heating of the slab 20. Generally this pressure is insufficient to produce any substantial molding of the slab 20 although it is within the scope of the invention to use higher pressure.

As soon as the preheating in press 30 is completed, the molded assembly designated 44 is removed from the press 30 and transferred to the press 46 illustrated in FIG. 6. The platens 48 and 50 of press 44 are both cold, and the assembly is maintained in this press until it has cooled. In this press the assembly 44 is subjected to high pressure sufficient to cause a penetration to the depth desired in the finished plate. The pressure in press 46 may be of the order of about 1750-2000 pounds to the square inch, or even higher. The operator of the press can readily judge or determine the proper pressure in any given case which is needed to produce the desired depth of penetration.

When the assembly 44 has cooled sufficiently in press 46, it is removed therefrom and the printing plate 56 illustrated in FIG. 7 is separated from the pattern 24. Upon the separation of the plate 56 from the pattern 24, it is ready to be used in printing or forming stereotypes, except that occasionally it is found advantageous to machine the rear or flat face in order to give the plate more accurate thickness. As may be seen in FIGS. 8 and 9, the paper layer 22 becomes a part of the printing plate 56, but in the molding operation the plastic material of the slab 20 penetrates through the paper layer, as best seen in FIG. 9, so that a surface 58 of plastic is presented on the printing face of the plate. On the other hand, the paper layer contours as indicated in FIGURES 8 and 9 to follow very closely the configuration of the surface of the molded plate. It should be understood in this connection that in FIGS. 8, 9 and 10 the relative depths of various portions of the plate are exaggerated in order to show the construction more clearly.

FIGURE 4 illustrates a preheater 60 of a type which can be used instead of a press, such as the press 30. The preheater 60 as shown is provided with upper and lower plates 62 and 64 which may be hinged together along one edge if desired. Each of the plates is provided with means for heating it, such as, for example, the electrical heating elements 66 and 68 illustrated. In this particular preheater 60 such pressure as is applied to an assembly 28 is supplied entirely by the weight of the upper plate 62.

With either a press, such as the press 30 or a simple preheater such as 60, it has been found desirable to prevent air from circulating around the assembly 28 during the preheating. To this end the preheater 60 is provided on all four sides with leaves such as the leaves 70, 72, and 74 which can be dropped into place over the gap between the plates 62 and 64, or elevated to permit ready removal of the assembly 28. In FIGURE 4 the leaves 70 and 72 are shown in their lowered position and the leaf 74 is shown in raised position. All three of the leaves 70, 72, 74, are similarly supported upon pins or studs 76 secured to the upper plate 62. These pins 76 extend in slot 78 in the plates and are provided with heads 80. As best seen in the leaf 70, each of the slots 78 is of J shape so that when the leaf 70 is raised and moved laterally, the pins 76 enter the toe of the J whereby the leaf 70 is maintained in elevated position. Any other desired means of preventing air circulation may be used.

In accordance with the procedure described above an assembly such as the assembly 28 is first placed in the preheater 60 where it remains until it has been heated sufficiently to mold. Thereupon the preheater 60 is opened and the heated assembly 28 is quickly removed to a press such as the press 46. The press 46 is then immediately closed to produce the desired penetration and the assembly is maintained in this press under pressure until it has cooled. As pointed out above, the platens of the press 46 are both cold. The molded assembly 44 when cooled is removed as described above and a plate 56 is obtained.

The extent to which the press 46 should be closed is readily determined in any given case and the desired result is then obtained by applying sufficient pressure to close the press to this extent. The distance which should remain between the platens is determined by adding together the thickness of the mat or pattern measured from the back to a portion corresponding to the printing face and the thickness desired in the printing plate, again measuring from the printing face to the back. The sum of these measurements gives the distance which should remain between the platens or more specifically between two opposite faces of the assembly 28 after molding.

Generally printing plates of the type with which this disclosure is concerned are used in the molding of stereotype mats, although they are suitable for direct printing or other purposes. It is generally standard in the industry that plates to be used in preparing steretotype mats should be .105 inch thick from the printing face to the back. It is also generally standard in formation of pattern mats to be used in making such plates to provide a mat having a thickness from a portion corresponding to a printing face to the back of .125 inch. Satisfactory results can be obtained generally by assuming that the mat has been formed to this standard thickness, although for best results, it is preferable to measure each mat, and in calculating the distance to remain between the press platens, to use the thickness determined by this measurement.

Assuming, however, that the mat has been made to standard, the distance between the platens for the desired penetration would then be .125 inch plus .105 inch or .230 inch. This will vary somewhat due to the compression of the mat in the molding operation and must be adjusted to meet operating conditions.

The thickness of the thermoplastic backing slab also has a bearing on the results obtained in accordance with this invention, although the minimum thickness and preferred thickness for such a slab will vary depending upon the thickness desired in the finished plate. Again, using a plate intended to be used in pressing stereotype mats as an illustration, it has been found that to make a plate of the desired thickness, .105 inch, the thermoplastic slab should have a minimum thickness of .125.

Thicknesses above .125 inch may be used, but are generally avoided, since they are uneconomical because they merely increase the amount of flash to be discarded without improving the result. It should be understood that some variation of the order of ±.005 inch in thickness from the figure specified does not appreciably affect the result.

In the light of the above, where it is desired to produce finished plates of a thickness other than .105 the proper thickness of the slab could be readily determined. It is important to bear in mind, however, that the minimum thickness of slab to give satisfactory results is lowest when the pattern to be reproduced is all or nearly all type or open areas, and that the minimum thickness increases as the portion of the area represented by type or open areas decreases, that is, for example with patterns containing substantial halftone areas the minimum thickness is higher than if the pattern were mostly type and open areas.

FIGURE 10 illustrates a modified type of preformed unit 82 which is similar to the unit 26 in that it includes a thermoplastic slab backing 84 having a paper sheet 86 calendered or otherwise secured to one face thereof. It differs from the unit 26, however, in that the paper sheet has deposited thereon resin solids 88 which are the solids of a varnish applied thereto as previously described herein. These resin solids, which may also include the solids of a mold release agent as previously described together with various other ingredients if desired, are deposited on the surface of the paper sheet and also among the fibers as illustrated. It has been found that these resin solids on the exposed face of the paper sheet aid in forming more accurate printing plates which more exactly reproduce the pattern from which they are made.

By way of illustration, it has been found that an excellent printing plate can be made in accordance with the foregoing teachings in the following manner. A thermoplastic slab is prepared as described above from the preferred composition, consisting of sixty parts by weight of Vinylite VYHH resin, forty parts by weight of Vinylite VYNW resin, and 1.75 parts by weight of basic lead carbonate and 1.75 parts by weight of calcium stearate. A small amount of coloring material may be added if desired. After this composition has been sheeted out in slab form, a sheet of very long fibre manila paper such as that sold under the trademark "Dextilose" and having a ream weight of 11.5 to 12.5 pounds (based on a ream of 500 sheets, 24 inches by 36 inches) and a thickness of about .0025 inch and in which the fibres are crisscrossed and interlaced and extend in all directions is calendered to one face of the slab.

Excellent results are also obtained with other fibrous sheet materials similar to that described in the preceding sentence, such as, for example, the sheet material known as "Kimpak Type 4."

This slab and sheet is then assembled with a pattern mat as illustrated in FIG. 3 of the drawings and preheated in a press as illustrated in FIG. 5, the platens of which are heated to a temperature of about 300 degrees F. After the assembly has been so preheated for about two to four minutes under a pressure sufficient to maintain good contact, the press is opened, and the assembly is removed and placed in a second press with cold platens wherein it is subjected to the high pressure required to form a printing plate of the desired thickness. When the assembly is cooled it is removed from this press and the finished plate can then be readily separated from the matrix.

Many of the advantages of the invention will be apparent from the foregoing description. The paper layer holds the resinous material during molding against lateral displacement and thereby causes it to be forced down into the pattern to achieve more accurate molding. Also the slab form of material is much more convenient to handle at the time the printing plate is to be molded than finely divided plastic material. The messiness of the latter and the need to use much larger pattern mats in connection therewith are both avoided. The back pressure of the slab form makes the larger mats unnecessary.

A particularly advantageous and convenient printing plate blank is that described above, which consists of the slab backing and the layer of paper calendered or otherwise secured thereto. It has been found that printing plates made with the slab and the paper layer are free of surface irregularities as well as subsurface defects. Thus no such test as the bumping described before is necessary with plates made in accordance with this disclosure. They may be applied without such tests immediately in the making of stereotype mats or in printing operations without any fear that they will fail in such use.

It is apparent that many widely different embodiments of this invention may be made without departing from the spirit and scope thereof, and therefore it is not intended to be limited except as in the appended claims.

I claim:

1. A printing plate formed of thermoplastic resin material and having a paper sheet layer which extends in the plate adjacent to and approximately parallel to the printing face of the said plate and has a configuration conforming roughly to that of the surface of said plate on which the printing face is formed.

2. A printing plate formed of thermoplastic resin material and having a paper tissue sheet layer which extends in the plate adjacent to and approximately parallel to the printing face of the said plate and has a configuration conforming roughly to that of the surface of said plate on which the printing face is formed.

3. A printing plate formed of a tough, non-resilient vinyl chloride-vinyl acetate copolymer resin composition flowable at elevated temperature and having a paper sheet layer which extends in the plate adjacent to and approximately parallel to the printing face of the said plate and has a configuration conforming roughly to that of the surface of said plate on which the printing face is formed.

4. A printing plate formed of thermoplastic resin material and having imbedded in the resin material a layer of long fibre manila paper, in which the fibres extend in at least two different directions approximately at right angles to each other, which extends in the plate adjacent to and approximately parallel to the printing face of the said plate and has a configuration conforming roughly to that of the surface of said plate on which the printing face is formed.

5. A printing plate formed of a tough, non-resilient vinyl chloride-vinyl acetate copolymer resin composition flowable at elevated temperature and having imbedded in the resin material a layer of long fibre manila paper in which the fibres extend in at least two different directions approximately at right angles to each other, which extends adjacent to and approximately parallel to the printing face of the said plate and has a configuration conforming roughly to that of the surface of said plate on which the printing face is formed.

References Cited in the file of this patent

UNITED STATES PATENTS

| | | |
|---|---|---|
| 1,377,510 | Novotny | May 10, 1921 |
| 1,401,633 | Novotny | Dec. 27, 1921 |
| 2,078,535 | Hagedorn et al. | Apr. 27, 1937 |
| 2,272,254 | Swan | Feb. 10, 1942 |
| 2,517,701 | Oettinger | Aug. 8, 1950 |
| 2,525,310 | Novak | Oct. 10, 1950 |
| 2,558,269 | Reilly | June 26, 1951 |
| 2,645,178 | Brainard et al. | July 14, 1953 |
| 2,703,051 | Richardson | Mar. 1, 1955 |